tent Office 3,388,147
Patented June 11, 1968

3,388,147
2-FLUORO-2,2-DINITROETHYL CARBONATES AND PRODUCTION THEREOF
Mortimer J. Kamlet and Kathryn G. Shipp, Silver Spring, Md., and Marion E. Hill, Palo Alto, Calif., assignors to the United States of America as represented by the Secretary of the Navy
No Drawing. Filed Dec. 9, 1965, Ser. No. 514,763
7 Claims. (Cl. 260—463)

The invention described herein may be manufactured and used by or for the Government of the United States of America for governmental purposes without the payment of any royalties thereon or therefor.

This invention pertains to novel energetic compounds and more particularly to novel compounds containing the fluorodinitromethyl group and a method for their preparation.

In a program to design insensitive high explosive molecules, a theoretical study of the factors which affect impact sensitivity was conducted. From this study it was concluded that the entropy of activation in the decomposition process is a quantity strongly influencing sensitivity, with the steric configuration about the bond most readily broken being especially important, and it was predicted that compounds containing a fluorodinitromethyl group would comprise a class in which reduced sensitivity to impact and improved thermo stability could be achieved without excessive sacrifice of explosive power.

Accordingly, it is an object of this invention to produce novel compounds containing the fluorodinitromethyl group which are useful as explosives and/or propellant ingredients.

It is another object to provide compounds that have a reduced sensitivity to impact and improved thermo stability.

These and other objects will become more readily apparent from reading the following detailed description of the invention.

The objects of this invention are accomplished by producing the following compounds:
Bis(2-fluoro-2,2 - dinitroethyl)carbonate (BFDNEC), tetrakis(2 - fluoro - 2,2 - dinitroethyl)orthocarbonate (FDNEOC), and tris(2-fluoro - 2,2-dinitroethyl)orthoformate (FDNEOF).

BFDNEC is generally produced by reacting 2-fluoro-2,2-dinitroethanol with carbon tetrachloride in the presence of a wet ferric chloride catalyst. The alcohol and catalyst are added to the carbon tetrachloride which functions both as a solvent and a reactant, and the mixture is heated, generally to the reflux temperature, to initiate the reaction. The ferric chloride is kept wet throughout the reaction, but the water present should not be sufficient to hydrate all of the ferric chloride since an excess of water will swamp the reaction. If the reaction should be swamped by the addition of an excess of water, it may readily be reinitiated by the addition of a small amount of anhydrous ferric chloride.

FDNEOC is generally prepared by reacting 2-fluoro-2,2-dinitroethanol with carbon tetrachloride in the presence of an anhydrous ferric chloride catalyst. The reaction is initiated by heating and it is generally run at the reflux temperature of the carbon tetrachloride which again functions both as a solvent and a reactant. The catalyst should be kept anhydrous throughout the reaction since the presence of water will produce BFDNEC as a byproduct.

FDNEOF is generally prepared by reacting 2-fluoro-2,2-dinitroethanol with chloroform in the presence of an anhydrous ferric chloride catalyst. The reaction again is initiated by heating and it is generally run at the reflux temperature of the chloroform which functions both as a solvent and a reactant.

The 2-fluoro-2,2-dinitroethanol used in the above reactions is generally prepared by fluorinating an alkali metal salt of 2,2-dinitroethanol with perchloryl fluoride. The preparation of fluorodinitroethanol is set forth in more detail in copending application Ser. No. 480,258 filed on Aug. 13, 1965 by M. J. Kamlet which is hereby incorporated by reference. Alternatively the fluorodinitroethanol may be prepared by the method described in application Ser. No. 387,556, filed on July 31, 1964 by H. S. Adolph which is also hereby incorporated by reference.

Following examples are illustrative of the invention but they are not to be considered as limiting the invention in any manner.

Example I

A mixture of 5.0 g. anhydrous ferric chloride and 70 ml. carbon tetrachloride was placed in a 200 ml. creased 3-neck round-bottom flask fitted with magnetic stirrer, two small dropping funnels and a condenser which was connected through a bubbler to a methanol gas trap. The stirred mixture was heated to reflux and 0.5 ml. water was added dropwise until the ferric chloride was partially hydrated and the carbon tetrachloride appeared cloudy. Then dropwise addition of 5.0 ml. (0.75 g., 0.05 mole) of 2-fluoro-2,2-dinitroethanol was begun, alternating with the addition of more water. After two hours all of the fluorodinitroethanol and 5 ml. of water had been added (carbon tetrachloride, 25 ml. was added in 5 ml. portions during the reaction period to maintain the level of solvent). The mixture was heated and stirred for an additional hour and then cooled.

The carbon tetrachloride solution was decanted from the ferric chloride, combined with two 5 ml. washings of the ferric chloride and placed in a 100 ml. flask fitted with reflux condenser and magnetic stirrer. An additional 5 ml. fluoro dinitroethanol and 1.0 ml. antimony pentachloride were added and the resulting clear yellow solution was stirred and refluxed overnight.

The carbon tetrachloride was then removed under reduced pressure and the residual oil added to iced water. A white solid product formed and was filtered off and dried to yield 15.8 g. or 95% of the theoretical amount of crude bis(2 - fluoro - 2,2 - dinitroethyl)carbonate (BFDNEC). This material was recrystallized by dissolving in 75 ml. hot chloroform, treating with Norite and Celite, adding 50 ml. hexane and chilling. The yield of pure bis(2-fluoro-2,2-dinitroethyl) carbonate (BFDNEC), colorless needles, M.P. 44–45°, was 90–92% of theoretical.

PROPERTIES OF BFDNEC

Impact sensitivity \_\_\_\_ 42 cm. (25 shot determination).
Crystal density _____ 1.79 g./cc.
Vacuum stability \_\_\_\_ 0.1 cc./gm./48 hr. at 100° C.

Example II

Anhydrous ferric chloride, 1.0 g., was added to 30 ml. carbon tetrachloride in a 100 ml. round bottom flask fitted with a magnetic stirrer and a reflux condenser connected through a bubbler to a methanol gas trap. The stirred mixture was refluxed for several h in order to dry the ferric chloride and carbon tetrachloride thoroughly. After cooling to room temperature 10 ml. (15 g., 0.1 mole) fluorodinitroethanol was added and the mixture again heated.

As the mixture warmed there was gentle evolution of gas which became vigorous as the reflux temperature was reached and heating was discontinued. Vigorous gas evolution and refluxing of solvent continued for ten minutes, then subsided whereupon heat was reapplied and removed again when the vigorous reaction set in. Again self-reflux and gas evolution continued for about 10 minutes. When heat was again applied there was gentle evolution of gas for 10–15 minutes, then gas evolution tapered off rapidly. Heating and stirring were continued for a further hour.

The mixture was cooled and filtered and the ferric chloride plus crystalline product was added to ice water and stirred until the ferric chloride dissolved. The crude tetrakis(2-fluoro-2,2-dinitroethyl)orthocarbonate (FDNEOC) was filtered off, washed well with water and dried at 50° C. A creamy white crystalline product weighing 14.4 g. (86%) was obtained. This material was recrystallized from ether-chloroform with Norite and Celite to yield 12.6 g. (81%) pure tetrakis(2-fluoro - 2,2-dinithoethyl) orthocarbonate (FDNEOC) as colorless needles, M.P. 136°.

PROPERTIES OF FDNEOC

Crystal density _____ 1.71 g./cc.
Impact sensitivity ____ 21 cm. (25 shot determination).
Vacuum stability ____ 0.13 cc./gm./48 hr. at 100° C.

Example III

A mixture of 0.5 g. anhydrous ferric chloride and 10 ml. chloroform was placed in a 30 ml. round-bottom flask fitted with a magnetic stirrer and a reflux condenser connected through a bubbler to a methanol gas trap. 2-fluoro-2,2-dinitroethanol, 2.0 g. (0.013 mole) was added and the mixture stirred and refluxed for 24 hours, after which time the mixture was collected to room temperature and the solvent removed in vacuo.

The residue was drowned in iced water, stirred until the ferric chloride dissolved and the crystalline product collected. Recrystallization of this material from chloroform-hexane gave 1.38 g. (68%) pure tris(2-fluoro-2-2-dinitroethyl) orthoformate (FDNEOF) as fine colorless needles, M.P. 110–111.2°.

PROPERTIES OF FDNEOF

Crystal density _____ 1.76 g./cc.
Impact sensitivity ____ 13 cm. (13 shot determination).
Vacuum stability ____ 0.11 cc./gm./48 hr. at 100° C.

The compounds of this invention have improved properties over energetic compounds having similar explosive or propellant performance. BFDNEC may be used as an energetic plasticizer ingredient for solid propellants. FDNEOC and FDNEOF are both high explosives and FDNEOF may be also used either to improve the specific impulse of propellants or as a burning rate additive.

Obviously many modifications and variations of the present invention are possible in the light of the above teachings. It is therefore to be understood, that within the scope of the appended claims, the invention may be practiced otherwise than as specifically described.

What is claimed is:

1. A compound selected from the group consisting of bis(2-fluoro-2,2-dinitroethyl) carbonate, tetrakis(2-fluoro-2,2-dinithoethyl) orthocarbonate and tris(2 - fluoro-2,2-dinitroethyl) orthoformate.

2. The compound of claim 1 wherein the compound is bis(2-fluoro-2,2-dinithoethyl) carbonate.

3. The compound of claim 1 wherein the compound is tetrakis(2-fluoro-2,2-dinitroethyl) orthocarbonate.

4. The compound of claim 1 wherein the compound is tris(2-fluoro-2,2-dinitroethyl) orthoformate.

5. The process for producing the compound of claim 2 which comprises reacting 2-fluoro-2,2-dinitroethanol with carbon tetrachloride in the presence of a wet ferric chloride catalyst.

6. A process for producing the compound of claim 3 which comprises reacting 2-fluoro-2,2-dinitroethanol with carbon tetrachloride in the presence of an anhydrous ferric chloride catalyst.

7. The process of producing the compound of claim 4 which comprises reacting 2-fluoro-2,2-dinitroethanol with chloroform in the presence of an anhydrous ferric chloride catalyst.

References Cited

UNITED STATES PATENTS 3,160,654 12/1964 Conly _____ 149—88 X
3,223,725 12/1965 Hill _____ 149—88 X CHARLES B. PARKER, *Primary Examiner.*

B. R. PADGETT, *Examiner.*

L. C. MARUZO, L. A. SEBASTIAN,
*Assistant Examiners.*